(12) United States Patent
Kimura (10) Patent No.: US 8,502,919 B2
(45) Date of Patent: Aug. 6, 2013

(54) VIDEO DISPLAY DEVICE AND VIDEO DISPLAY METHOD

(75) Inventor: Tatsuo Kimura, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 13/498,896

(22) PCT Filed: Sep. 30, 2009

(86) PCT No.: PCT/JP2009/067011
§ 371 (c)(1),
(2), (4) Date: Mar. 28, 2012

(87) PCT Pub. No.: WO2011/039852
PCT Pub. Date: Apr. 7, 2011

(65) Prior Publication Data
US 2012/0188448 A1    Jul. 26, 2012

(51) Int. Cl.
*H04N 5/06* (2006.01)
*H03L 7/00* (2006.01)

(52) U.S. Cl.
USPC ............ 348/537; 348/540; 348/547; 348/572

(58) Field of Classification Search
USPC ................. 348/521, 500, 524, 536, 537, 540, 348/541, 547, 572, 571, 708; 375/354, 362, 375/375, 376; 345/213
IPC ..................... H04N 5/04,5/06, 9/44, 9/45, 5/05, H04N 9/455, 9/64
See application file for complete search history.

(56) References Cited

U.S. PATENT DOCUMENTS

| 6,924,796 B1* | 8/2005 | Someya et al. ............... 348/537 |
| 2007/0132881 A1 | 6/2007 | Tani |
| 2008/0002058 A1 | 1/2008 | Kawana et al. |
| 2008/0316361 A1 | 12/2008 | Ito et al. |
| 2010/0201874 A1 | 8/2010 | Kawana et al. |

FOREIGN PATENT DOCUMENTS

| JP | 2000-122594 A | 4/2000 |
| JP | 2000-276092 A | 10/2000 |

(Continued)

OTHER PUBLICATIONS

International Search Report in PCT/JP2009/067011 dated Nov. 10, 2009 (English Translation Thereof).

*Primary Examiner* — Sherrie Hsia
(74) *Attorney, Agent, or Firm* — McGinn IP Law Group, PLLC (57) ABSTRACT

Provided is a video display device that quickly determines, when a video signal of unknown resolution is input from the outside, the resolution of the video signal to correctly display a video. The video display device includes: A/D conversion unit for converting an analog video signal into a digital video signal by using a dot clock; clock generation unit for generating a dot clock of a predetermined frequency; phase adjustment unit for adjusting a phase of the dot clock; and control unit for estimating vertical resolution of the analog video signal based on a vertical synchronization signal and a horizontal synchronization signal, causing the clock generation unit to generate a dot clock of a frequency that corresponds to each pre-registered horizontal resolution candidate, calculating a maximum total difference value of the digital video signal while causing the phase adjustment unit to adjust a phase of the dot clock, and determining, among all the horizontal resolution candidates, the horizontal resolution, in which the maximum total difference value is largest, to be horizontal resolution of the analog video signal.

8 Claims, 4 Drawing Sheets

FOREIGN PATENT DOCUMENTS

| | | |
|---|---|---|
| JP | 2001-346127 A | 12/2001 |
| JP | 2007-086614 A | 4/2007 |
| JP | 2007-163848 A | 6/2007 |
| JP | 2008-009259 A | 1/2008 |
| JP | 4182124 B2 | 11/2008 |
| JP | 2009-003240 A | 1/2009 |

* cited by examiner

Fig.1

| RESOLUTION | ASPECT RATIO | VERTICAL RESOLUTION |
|---|---|---|
| 640×480 | 4:3 | 480 |
| 848×480 | 16:9 | |
| 768×480 | 16:10 | |
| 800×600 | 4:3 | 600 |
| 1064×600 | 16:9 | |
| 960×600 | 16:10 | |
| 1280×720 | 16:9 | 720 |
| 1152×720 | 16:10 | |
| 1024×768 | 4:3 | 768 |
| 1360×768 | 16:9 | |
| 1224×768 | 16:10 | |
| 1280×768 | 15:9 | |
| 1280×800 | 16:10 | 800 |
| 1152×864 | 4:3 | 864 |
| 1440×900 | 16:10 | 900 |
| 1280×960 | 4:3 | 960 |
| 1074×960 | 16:9 | |
| 1536×960 | 16:10 | |
| 1280×1024 | 5:4 | 1024 |
| 1400×1050 | 4:3 | 1050 |
| 1864×1050 | 16:9 | |
| 1680×1050 | 16:10 | |
| 1920×1080 | 16:9 | 1080 |
| 1728×1080 | 16:10 | |
| 1600×1200 | 4:3 | 1200 |
| 2128×1200 | 16:9 | |
| 1920×1200 | 16:10 | |

| VERTICAL RESOLUTION | HORIZONTAL RESOLUTION | | | |
|---|---|---|---|---|
| | 1 | 2 | 3 | 4 |
| 480 | 640 | 848 | 768 | - |
| 600 | 800 | 1064 | 960 | - |
| 720 | 1280 | 1152 | - | - |
| 768 | 1024 | 1360 | 1224 | 1280 |
| 800 | 1280 | - | - | - |
| 864 | 1152 | - | - | - |
| 900 | 1440 | - | - | - |
| 960 | 1280 | 1704 | 1536 | - |
| 1024 | 1280 | - | - | - |
| 1050 | 1400 | 1864 | 1680 | - |
| 1080 | 1920 | 1728 | - | - |
| 1200 | 1600 | 2128 | 1920 | - |

Fig.6

VIDEO DISPLAY DEVICE AND VIDEO DISPLAY METHOD

TECHNICAL FIELD

The present invention relates to a video display device and a video display method that can display video signals having a plurality of kinds of resolution.

BACKGROUND ART

In recent years, a notebook personal computer and a desktop personal computer (hereinafter, each referred to as PC) compatible to a wide display horizontally longer than a conventional display have gained more in popularity. Each PC outputs video signals having various kinds of resolution such as resolution corresponding to the conventional display and resolution corresponding to the wide display.

Figure 1:
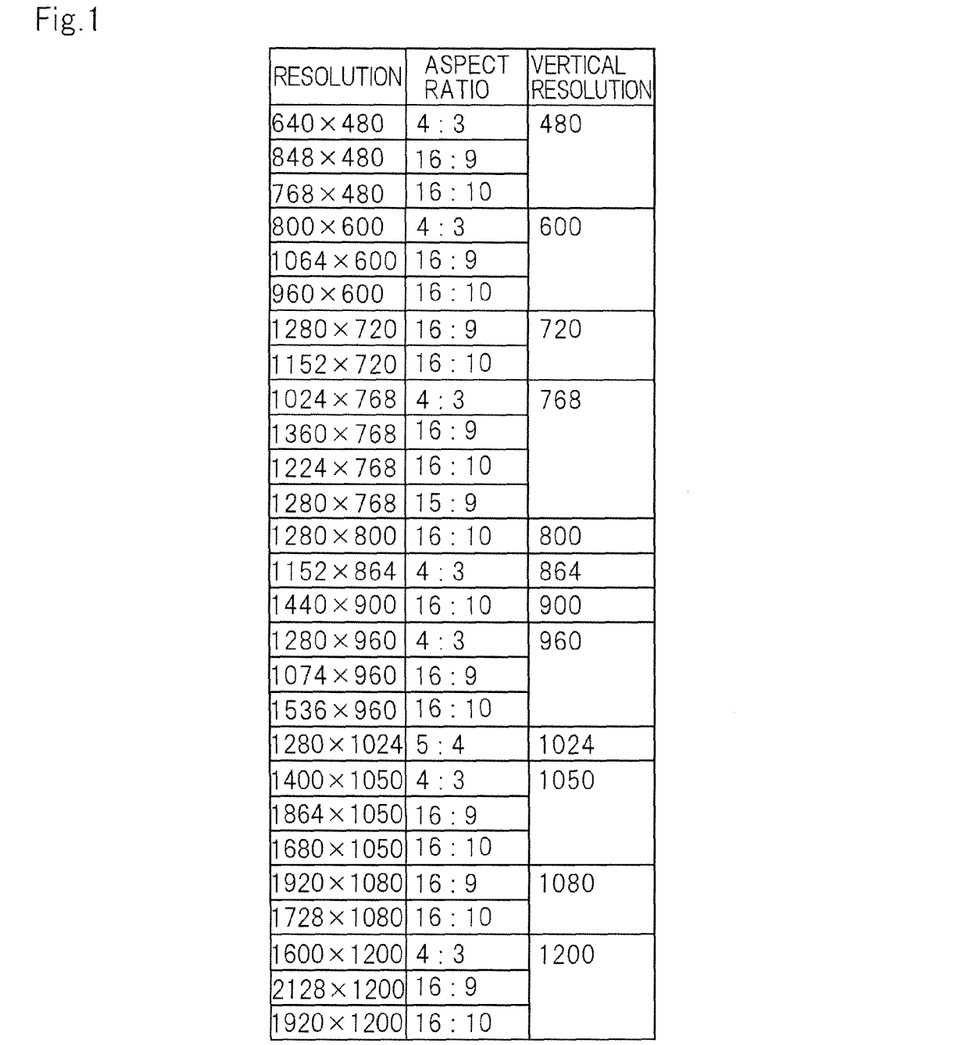
FIG. 1 a view showing an example of a combination of resolution of a video signal and an aspect ratio supported by a currently representative PC.

FIG. 1 shows an example of a combination of resolution of a video signal and an aspect ratio that a currently representative PC supports. As shown in FIG. 1, there are various kinds of resolution for video signals, and horizontal resolution corresponding to vertical resolution is not limited to one kind of resolution.

For example, when a video signal output from the PC is input to a projector, and the projector displays a video, the projector must determine resolution of the input video signal. The video signal includes a vertical synchronization signal and a horizontal synchronization signal. This enables the projector to determine vertical resolution by detecting the number of vertical lines from the vertical synchronization signal and the horizontal synchronization signal. However, horizontal resolution corresponding to each vertical resolution is not necessarily one kind of resolution. It is therefore difficult to accurately determine horizontal resolution.

The video display device generates a dot clock to sample input video signals. Generally, the video display device includes a PLL (Phase Locked Loop; phase synchronization circuit. By changing the frequency division ratio of the PLL circuit, a frequency of the dot clock can be adjusted to be an integral multiple of a horizontal synchronization signal of the input video signal.

The video display device that has determined horizontal resolution of the input video signal can sample input video signals based on the dot clock of a frequency corresponding to the horizontal resolution. Accordingly, the video display device can correctly sample video signals. However, when the input video signals are sampled based on the dot clock of a frequency corresponding to the wrong horizontal resolution, the video display device cannot correctly sample video signals.

For example, Patent Literature 1 discloses a technology for determining horizontal resolution based on input video signals. In a video signal processing device disclosed in Patent Literature 1, resolution of all video signals is registered in a signal information table. The video signal processing device narrows down horizontal resolution of the input video signals based on the number of vertical lines of the input video signals. When sampling of A/D (analog/digital) conversion is not carried out by the dot clock of a frequency corresponding to the horizontal resolution of the input video signals, even if the same analog video signal is input, different digital video signals are output. Thus, the video signal processing device measures, for each narrowed-down horizontal resolution, the difference between digital data generated by sampling based on the dot clock of a frequency corresponding to the horizontal resolution and digital data generated by sampling based on the same dot clock after a certain period of time, and determines horizontal resolution, in which the difference is smallest, to be the horizontal resolution of the input video signals.

Figure 2A:
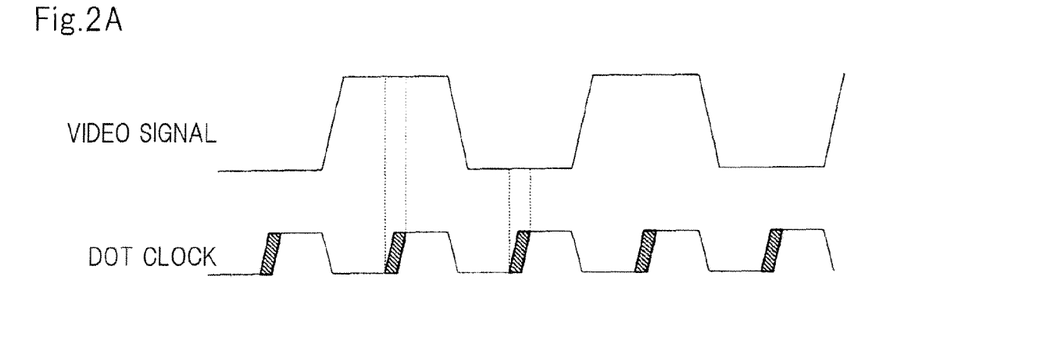
FIG. 2A is an explanatory view showing a correctly adjusted state of a phase relationship between the video signal and a dot clock.
Figure 2B:
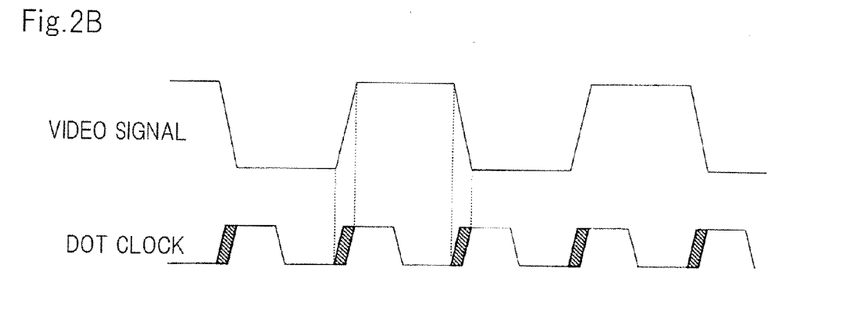
FIG. 2B is an explanatory view showing a shifted state of the phase relationship between the video signal and the dot clock.

In the video display device, when the input video signal and the phase of the dot clock are not correctly adjusted, jittering or flickering occurs in the displayed image. Patent Literature 2 discloses a technology for adjusting the phase of a dot clock. FIG. 2A is an explanatory view showing a correctly adjusted state of the phase relationship between a video signal and the dot clock disclosed in Patent Literature 2. FIG. 2B is an explanatory view showing a shifted state of the phase relationship between the video signal and the dot clock disclosed in Patent Literature 2.

In the dot clock generated in the PLL circuit, jittering occurs on a time axis. Shaded parts of the dot clocks shown in FIGS. 2A and 2B indicate jitter widths (hereinafter, jitter areas) formed due to the influence of jitters at rising edges of the dot clocks. As shown in FIG. 2A, when the video signal and the dot clock match each other in phase, during sampling at the rising edge of the dot clock, the output value is constant wherever in the jitter area the rising edge is located. On the other hand, as shown in FIG. 2B, when a phase shift occurs between the video signal and the dot clock, the output value changes depending on where in the jitter area the rising edge is located.

For example, it is presumed that the video signals shown in FIGS. 2A and 2B are reversed black and white for each pixel, and pixel values are alternated between 0 and 255. When the video signal and the dot clock match each other in phase, the output value is alternated between 0 and 255. Thus, the absolute value of a difference in pixel value between adjacent pixels is always 255. On the other hand, when a phase shift occurs between the video signal and the dot clock, the output value fluctuates between 0 and 255. Thus, the absolute value of a difference in pixel value between adjacent pixels is smaller than 255.

Based on this relationship, the technology disclosed in Patent Literature 2 adjusts the phase of the dot clock so that the value obtained by converting differences in pixel values between adjacent pixels into absolute values and cumulatively adding the absolute values can be largest.

RELATED ART LITERATURE

Patent Literature

Patent Literature 1: Japanese Patent Laid-Open No. 2009-3240

Patent Literature 2: Japanese Patent No. 418214

SUMMARY

Problems to be Solved by Invention

However, to determine the horizontal resolution of the input video signal by using the technology disclosed in Patent Literature 1, an A/D converter of the video signal processing device must output digital data having a plurality of frames for each narrowed-down horizontal resolution. Consequently, in the technology disclosed in Patent Literature 1, the time until determination of the horizontal resolution is longer.

The technology disclosed in Patent Literature 2, which is for adjusting the phase of the dot clock, does not determine horizontal resolution of the input video signal.

It is therefore an exemplary object of the present invention to provide a video display device that quickly determines, when a video signal of unknown resolution is input from the outside, the resolution of the video signal to correctly display a video image.

Solution to Problem

To achieve the object, an exemplary aspect of the present invention provides a video display device that includes: A/D conversion means for converting an input analog video signal into a digital video signal to sample the analog video signal by using a dot clock that defines sampling timing for the analog video signal; clock generation means for generating a dot clock of a predetermined frequency based on a horizontal synchronization signal of the analog video signal; phase adjustment means for adjusting a phase of the dot clock generated by the clock generation means; and control means for estimating vertical resolution of the analog video signal based on a vertical synchronization signal and the horizontal synchronization signal of the analog video signal, causing the clock generation means to generate a dot clock of a frequency corresponding to each horizontal resolution for each pre-registered horizontal resolution candidate, calculating a maximum total difference value indicating a total of absolute difference values of pixel values between adjacent pixels in a horizontal direction within a predetermined range of an image based on the converted digital video signal based on the dot clock while causing the phase adjustment means to adjust a phase of the dot clock, determining, among all the horizontal resolution candidates, the horizontal resolution, in which the maximum total difference value is largest. to be horizontal resolution of the analog video signal, and displaying a video corresponding to the determined horizontal resolution and the vertical resolution.

To achieve the object, an exemplary aspect of the present invention provides a video display method in a video display device that includes: A/D conversion means for converting an input analog video signal into a digital video signal to sample the analog video signal by using a dot clock that defines sampling timing for the analog video signal; clock generation means for generating a dot clock of a predetermined frequency based on a horizontal synchronization signal of the analog video signal; and phase adjustment means for adjusting a phase of the dot clock generated by the clock generation means. Control means estimates vertical resolution of the analog video signal based on a vertical synchronization signal and the horizontal synchronization signal of the analog video signal, causes the clock generation means to generate a dot clock of a frequency corresponding to each horizontal resolution for each pre-registered horizontal resolution candidate, calculates the maximum total difference value indicating a total of absolute difference values of pixel values between adjacent pixels in a horizontal direction within a predetermined range of an image based on the converted digital video signal based on the dot clock while causing the phase adjustment means to adjust a phase of the dot clock, determines, among all the horizontal resolution candidates, the horizontal resolution, in which the maximum total difference value is largest, to be horizontal resolution of the analog video signal, and displays a video corresponding to the determined horizontal resolution and the vertical resolution.

Effects of Invention

According to the present invention, in the video display device, when a video signal of unknown resolution is input from the outside, resolution of the video signal can be quickly determined to correctly display a video image.

EXEMPLARY EMBODIMENT

Next, the present invention is described in detail referring to the drawings.

A video display device generates a dot clock for sampling input video signals. The video display device includes a PLL circuit. By changing the frequency division ratio of the PLL circuit, the frequency of the dot clock is adjusted to be an integral multiple of the horizontal synchronization signal of the input video signal.

Figure 3A:
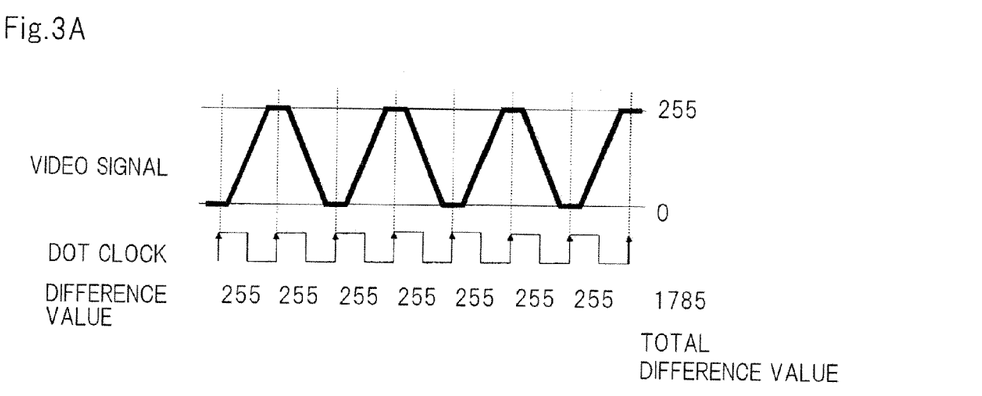
FIG. 3A is an explanatory view showing a matched state of frequencies and phases between the video signal and the dot clock.
Figure 3B:
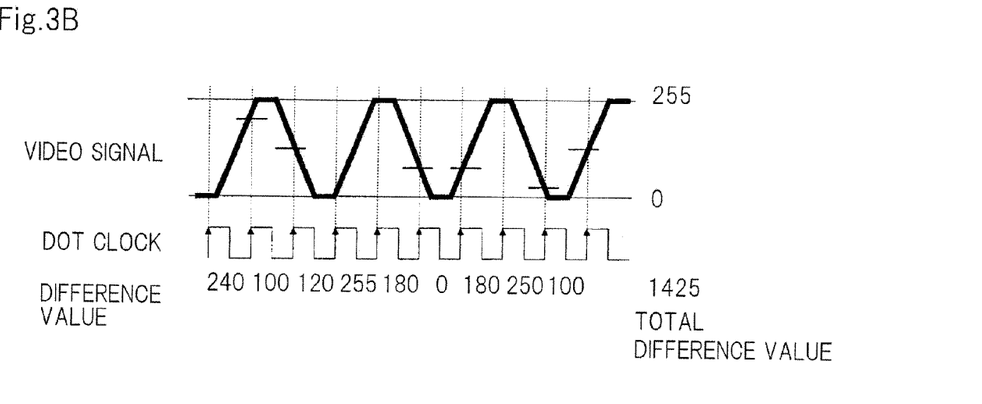
FIG. 3B is an explanatory view showing an unmatched state of frequencies or phases between the video signal and the dot clock.

FIG. 3A is an explanatory view showing the matched state of frequencies and phases between the video signal and the dot clock. FIG. 3B is an explanatory view showing the unmatched state of frequencies or phases between the video signal and the dot clock. For the video signals shown in FIGS. 3A and 3B, black and white are reversed for each pixel. The black pixel value is 0, while the white pixel value is 255.

The video display device samples the video signals at a rising edge of the dot clock. As shown in FIG. 3A, when the video signal and the dot clock match each other in frequency and phase, the video display device can sample a black pixel and a white pixel at correct timing. On the other hand, as shown in FIG. 3B, when the video signal and the dot clock do not match each other in frequency or phase, the video display device executes sampling during the time when a value change between the black pixel and the white pixel is occurring, and thus there is a period where no peak value is sampled.

Pixel values alternate between 0 and 255. Thus, when the video signal and the dot clock match each other in frequency and phase, the absolute value of a difference (hereinafter, difference value) in pixel values between adjacent pixels is always 255. On the other hand, when the video signal and the dot clock do not match each other in frequency or phase, sampling is executed during the time when a value change between the black pixel and the white pixel is occurring, and thus there is a period where the difference value is smaller than 255.

In the example shown in FIG. 3A, the video signal is sampled at seven points, and the total of the difference values (hereinafter, total difference value) is 1785. On the other hand, in the example shown in FIG. 3B, while the video signal is sampled at nine points, the total difference value is 1425. In the example shown in FIG. 3B, the number of sampling times is larger than that in the example shown in FIG. 3A. However, since there is a period where no peak value of the video signal is sampled, the total difference value is small.

Thus, the difference value of a video signal having black and white reversed for each pixel becomes largest, irrespective of the number of sampling times, when the video signal and the dot clock match each other in frequency and phase. This is not limited to a video signal having black and white reversed for each pixel. For example, except for a case where the pixel values in a horizontal direction are all equal as in the case of a video signal of only white or black and a case where pixel values in the horizontal direction monotonously increase or decrease as in the case of a video signal changed from black to white or from white to black, the difference value of a video signal becomes largest when the video signal and the dot clock match each other in frequency and phase.

Thus, according to the embodiment, horizontal resolution candidates of an input analog video signal are registered beforehand in the video display device. The video display device generates a dot clock of a frequency corresponding to each horizontal resolution candidate, and calculates the maximum total difference value of a digital video signal generated based on each dot clock. The video display device calculates maximum total difference values for all the horizontal resolution candidates, and determines horizontal resolution, in which the maximum total difference value is largest, to be horizontal resolution of the input analog video signal.

The video display device, which has determined the horizontal resolution of the input analog video signal, samples the input analog video signal by using the dot clock where the maximum total difference value is largest to convert it into a digital video signal. The video display device then executes processing such as displaying a video image by using the digital video signal.

The video display device according to the embodiment determines the horizontal resolution of the input video signal based on the difference between the pixels in the frame of an input video signal, thereby shortening time for determining the horizontal resolution.

Figure 4:
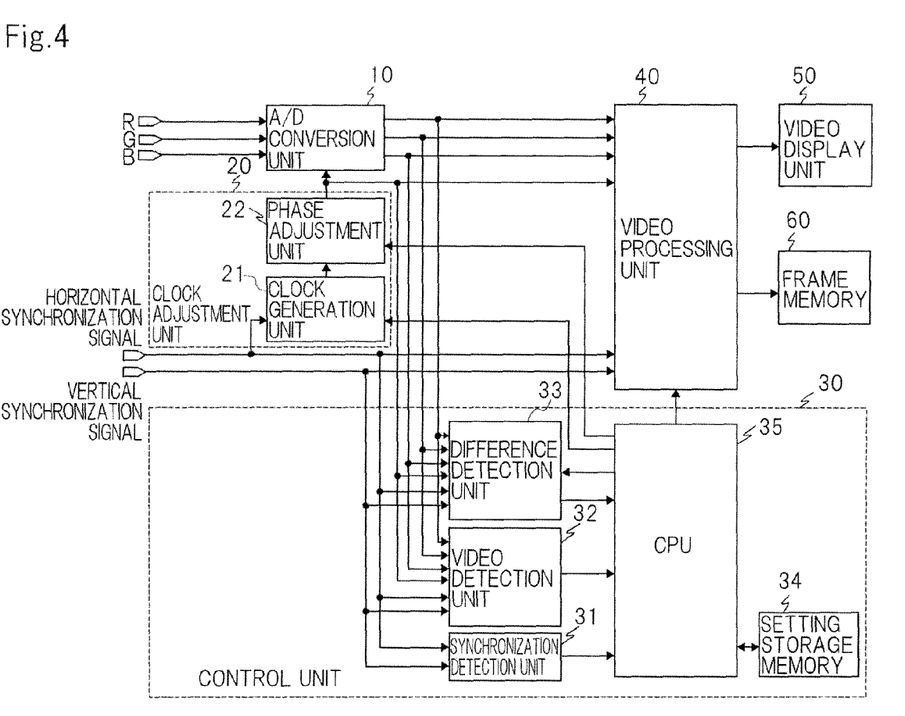
FIG. 4 is a block diagram showing a configuration of a video display device according to an exemplary embodiment.

FIG. 4 is a block diagram showing the configuration of a video display device according to the embodiment.

As shown in FIG. 4, the video display device according to the embodiment includes A/D conversion unit 10, clock adjustment unit 20, control unit 30, video processing unit 40, video display unit 50, and frame memory 60.

A/D conversion unit 10 receives an analog video signal from an external device such as a PC, and a dot clock from clock adjustment unit 20. A/D conversion unit 10 samples the analog video signal based on the dot clock input from clock adjustment unit 20 to convert it into a digital video signal.

Clock adjustment unit 20 generates a dot clock from a horizontal synchronization signal of the input analog video signal to output it to A/D conversion unit 10. Clock adjustment unit 20 includes clock generation unit 21 and phase adjustment unit 22.

Clock generation unit 21 is a PLL circuit included in a well-known video display device. Clock generation unit 21 receives the horizontal synchronization signal of the input analog video signal. Clock generation unit 21 multiplies the input horizontal synchronization signal to generate a dot clock. Clock generation unit 21 includes a frequency divider that divides a frequency of the input horizontal synchronization signal. A frequency of the dot clock can be adjusted by changing its frequency division ratio.

Phase adjustment unit 22 receives the dot clock from clock generation unit 21. Phase adjustment unit 22 adjusts a phase of the input dot clock, and outputs the dot clock of the adjusted phase to A/D conversion unit 10. Phase adjustment unit 22 includes a delay circuit that delays an input signal for a fixed time to output it. Phase adjustment unit 22 can adjust the phase of the dot clock by changing the delay time. The phase of the dot clock can be gradually shifted by, for example, predetermined angles.

Control unit 30 includes synchronization detection unit 31, video detection unit 32, difference detection unit 33, setting storage memory 34, and CPU (Central Processing Unit) 35.

Synchronization detection unit 31 receives the horizontal synchronization signal and a vertical synchronization signal of the input analog video signal. Synchronization detection unit 31 detects a horizontal synchronization frequency and a vertical synchronization frequency of the input analog video signal from the horizontal synchronization signal and the vertical synchronization signal. Synchronization detection unit 31 then notifies CPU 35 of the horizontal synchronization signal and the vertical synchronization signal that have been detected.

Video detection unit 32 receives the digital video signal from A/D conversion unit 10, the horizontal synchronization signal and the vertical synchronization signal of the input analog video signal, and the dot clock from clock adjustment unit 20. Video detection unit 32 determines a range of effective pixels (hereinafter, effective area) by analyzing the presence of the digital video signal, and detects a video start position in a horizontal direction, a video start position in a vertical direction, horizontal resolution, and vertical resolution of the digital video signal. Video detection unit 32 notifies CPU 35 of the video start position in the horizontal direction, the video start position in the vertical direction, the horizontal resolution, and the vertical resolution of the digital video signal that have been detected.

Difference detection unit 33 receives the digital video signal from A/D conversion unit 10, and the horizontal synchronization signal and the vertical synchronization signal of the input analog video signal. In difference detection unit 33, an image range to calculate a total difference value of the digital video signal is set from CPU 35. Difference detection unit 33 calculates, among image data based on the input digital video signal, the total difference value for the image range set from CPU 35. Difference detection unit 33 then notifies CPU 35 of the calculated total difference value.

Figure 5:
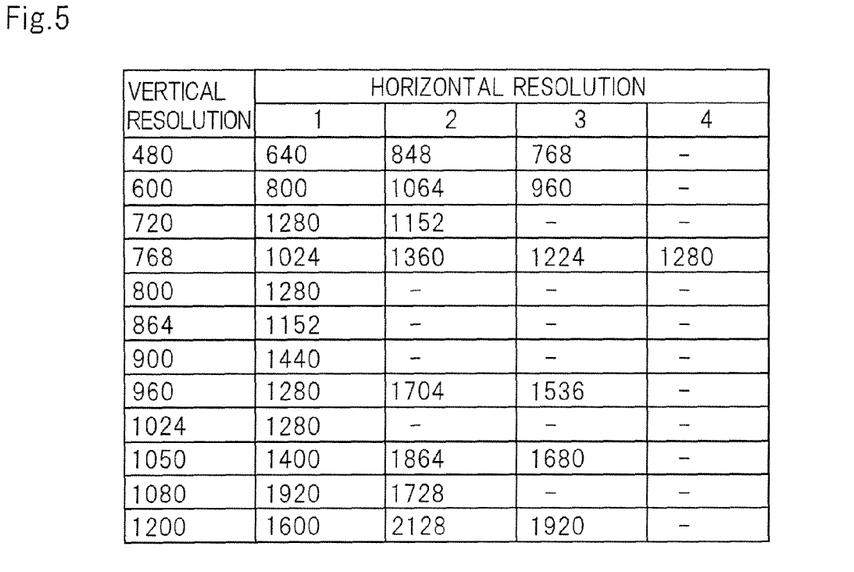
FIG. 5 is a view showing an example of a resolution table.

Setting storage memory 34 stores a resolution table that shows a horizontal resolution candidate of the input analog video signal for each vertical resolution. FIG. 5 shows an example of the horizontal resolution table. As shown in FIG. 5, the resolution table shows the horizontal resolution taken by a video signal that the video display device supports for each vertical resolution. The resolution table is set beforehand in setting storage memory 34.

CPU 35 receives the horizontal synchronization frequency and the vertical synchronization frequency of the input analog video signal from synchronization detection unit 31, and estimates virtual resolution of the input analog video signal based on the horizontal synchronization frequency and the vertical synchronization frequency that have been received.

CPU 35 extracts a horizontal resolution candidate from the resolution table stored in setting storage memory 34, and calculates a frequency division ratio to multiply the horizontal synchronization signal for generating the dot clock of a frequency that corresponds to each horizontal resolution to set it in clock generation unit 21. CPU 35 sets delay time to adjust a phase of the dot clock in phase adjustment unit 22.

CPU 35 acquires the video start position in the horizontal direction, the video start position in the vertical direction, the horizontal resolution, and the vertical resolution of the digital video signal from video detection unit 32, and calculates the effective area of the digital video signal based on the acquired information. CPU 35 determines, in the effective area of the digital video signal, an image range to calculate the total difference value to set it in difference detection unit 33. CPU 35 acquires the total difference value of the digital video signal from difference detection circuit 33, and determines horizontal resolution of the input analog video signal based on the acquired total difference value.

CPU 35 sets the vertical resolution and the horizontal resolution of the input analog video signal in video processing unit 40.

Video processing unit 40 receives the digital video signal from A/D conversion unit 10, and stores the input digital video signal in frame memory 60. In video processing unit 40, the vertical resolution and the horizontal resolution of the input analog video signal are set from CPU 35. When necessary, video processing unit 40 converts resolution of the input digital video signal into resolution according to the displaying resolution of video display unit 50, and outputs the converted signal to video display unit 50.

Video display unit 50 displays the video signal output from video processing unit 40.

Frame memory 60 stores the digital video signal.

Next, processing of CPU 35 to determine the horizontal resolution of the input analog video signal shown in FIG. 4 is described.

Figure 6:
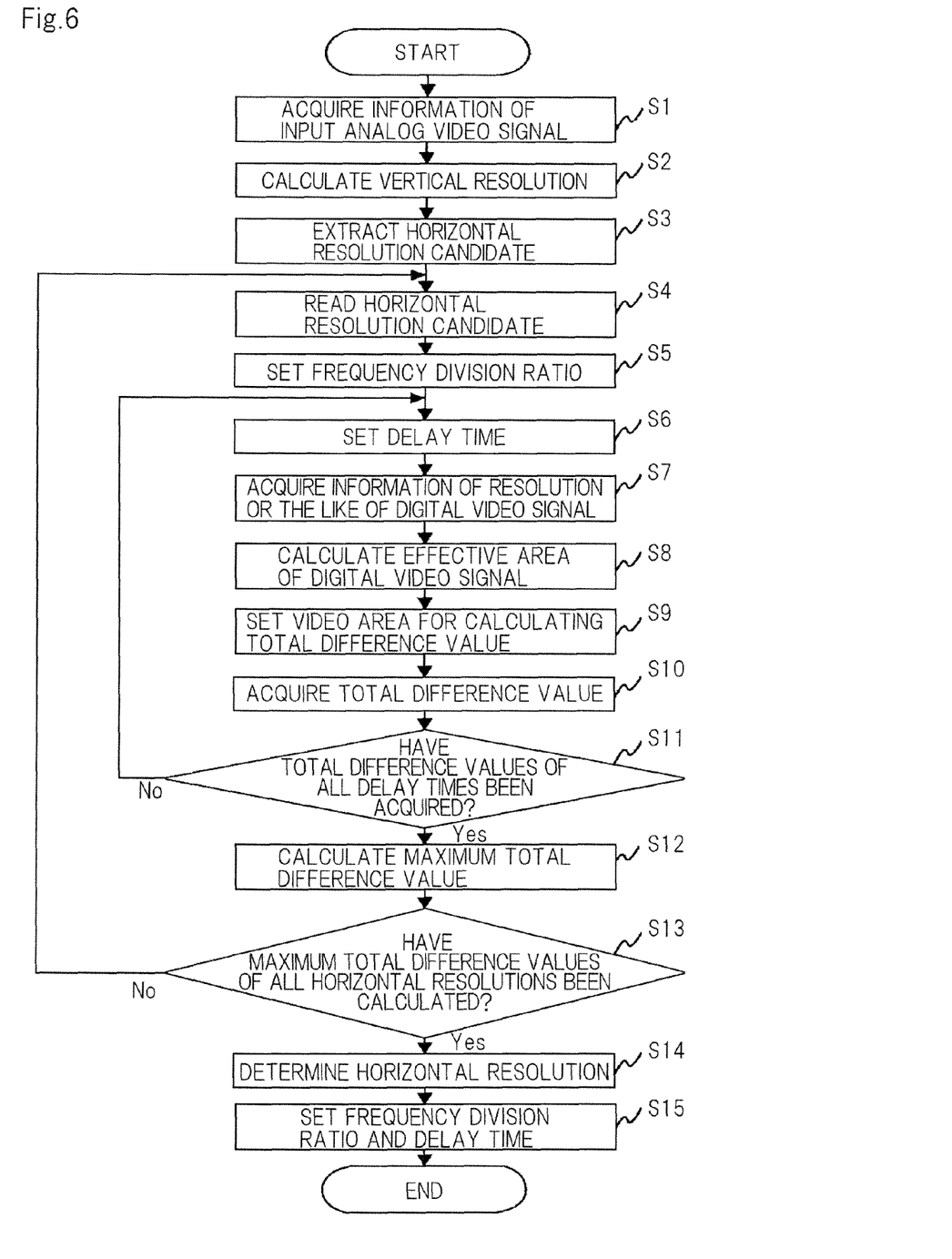
FIG. 6 is a flowchart showing processing where CPU 35 shown in FIG. 4 determines horizontal resolution of an input analog video signal.

FIG. 6 is a flowchart showing the processing of CPU 35 to determine the horizontal resolution of the input analog video signal shown in FIG. 4.

When the analog video signal is input, CPU 35 first receives the horizontal synchronization frequency and the vertical synchronization frequency of the input analog video signal from synchronization detection unit 31 (step S1). After reception of the horizontal synchronization frequency and the vertical synchronization frequency of the input analog video signal from synchronization detection unit 31, CPU 35 estimates virtual resolution of the input analog video signal based on the horizontal synchronization frequency and the vertical synchronization frequency that have been received (step S2). After reception of the vertical resolution, CPU 35 extracts horizontal resolution candidates corresponding to the calculated vertical resolution from the resolution table stored in setting storage memory 34 (step S3).

Then, CPU 35 reads one of the extracted horizontal resolution candidates from the resolution table stored in setting storage memory 34 (step S4). After the reading of one of the horizontal resolution candidates, CPU 35 sets a frequency division ratio to generate a dot clock of a frequency corresponding to the horizontal resolution in clock generation unit 21 (step S5). The set frequency division ratio takes a value assumed from the horizontal resolution candidate. CPU 35 then sets delay time to adjust a phase of the dot clock in phase adjustment unit 22 (step S6).

After the setting of the frequency division ratio and the delay time of the dot clock, CPU 35 acquires a video start position in a horizontal direction, a video start position in a vertical direction, horizontal resolution, and vertical resolution of the digital video signal sampled by the dot clock corresponding to the set frequency division ratio and the set delay time from video detection unit 32 (sep S7). After the acquisition of the video start position in the horizontal direction, the video start position in the vertical direction, the horizontal resolution, and the vertical resolution of the digital video signal, CPU 35 calculates the effective area of the digital video signal based on the acquired information (step S8). After calculation of the effective area of the digital video signal, CPU 35 determines, in the effective area of the digital video signal, an image range to calculate a total difference value to set it in difference detection unit 33 (step s9).

The image range to calculate the total difference value is set beforehand in the video display device. The image range to calculate the total difference value is, for example, one entire fame of the digital video signal.

After the setting of the image range to calculate the total difference value in difference detection unit 33, CPU 35 acquires the total difference value of the set image range from difference detection circuit 33 (step S10).

CPU 35 acquires, for the dot clock that corresponds to the predetermined horizontal resolution extracted as a candidate, the total difference value of the digital video signal while changing delay time set in phase adjustment unit 22 within the range of the dot clock. Thus, CPU 35 determines whether the total difference value has been acquired for each delay time within the range of the dot clock of the frequency corresponding to the current horizontal resolution candidate (step S11).

When no total difference value has been acquired for each delay time within the range of the dot clock of the frequency that corresponds to the current horizontal resolution candidate, CPU 35 returns to step S6 to repeat the processing for setting new delay time in phase adjustment unit 22 to acquire the total difference value. On the other hand, when the total difference value has been acquired for each delay time within the range of the dot clock of the frequency corresponding to the current horizontal resolution candidate, CPU 35 calculates the maximum value of the acquired total difference value. CPU 35 stores the maximum value of the total difference value and delay time when the total difference value is largest (step S12).

After calculation of the maximum value of the total difference value for the current horizontal resolution candidate, CPU 35 determines whether maximum total difference values have been calculated for all the extracted horizontal resolution candidates (step S13).

When maximum total difference values have not been calculated for all the extracted horizontal resolution candidates, CPU 35 returns to step S4 to repeat the processing for acquiring a total difference value for, among the extracted horizontal resolution candidates, horizontal resolution in which a maximum total difference value is yet to be calculated. On the other hand, when maximum total difference values have been calculated for all the extracted horizontal resolution candidates, CPU 35 determines horizontal resolution, in which the calculated maximum total difference value is largest, to be horizontal resolution of the input analog video signal (step S14).

After determination of the horizontal resolution of the input analog video signal, CPU 35 sets, in order to cause clock adjustment unit 20 to generate a dot clock where the maximum total difference value is largest thereafter, a frequency division ratio and delay time to generate the dot clock in clock adjustment unit 20 (step S15).

CPU 35 sets the vertical resolution estimated in step S2 and the horizontal resolution determined in step S14 in video processing unit 40. When necessary, video processing unit 40 converts resolution of the input analog video signal into resolution according to the displaying resolution of video display unit 50, and outputs the converted signal to video display unit 50.

For example, when the vertical resolution calculated in step S2 is 768, four resolution candidates of 1024, 1360, 1224, and 1280 are extracted from the resolution table shown in FIG. 5. In this case, CPU 35 executes the processing of steps S4 to S13 for four resolution candidates of 1024, 1360, 1224, and 1280.

CPU 35 first calculates the maximum total difference value of a digital video signal generated based on each dot clock while shifting the phase of a dot clock of a frequency corresponding to horizontal resolution candidate 1024. Then, CPU 35 calculates maximum total difference values for dot clocks of frequencies corresponding to horizontal resolution candidates 1360, 1224, and 1280. CPU 35 determines horizontal resolution, in which the calculated maximum total difference value is largest, to be horizontal resolution of the input analog video signal.

The embodiment has been directed to the example where the horizontal resolution candidate of the input analog video signal is shown for each vertical resolution. However, the present invention is not limited to this case. Any resolution table can be employed as long as horizontal resolution candidates can be extracted. For example, a resolution table that shows only horizontal resolution can be employed. In this case, the video display device extracts all horizontal resolution candidates shown in the resolution table.

For example, a resolution table that shows an aspect ratio candidate of the input analog signal for each vertical resolution can be employed. In this case, CPU 35 extracts an aspect ratio candidate corresponding to the vertical resolution from the resolution table, and calculates a horizontal resolution candidate from each aspect ratio and the vertical resolution.

As described above, according to the embodiment, the video display device estimates vertical resolution based on the vertical synchronization signal and the horizontal synchronization signal of the input analog video signal. In the video display device, the horizontal resolution candidates of the input analog video signal are registered beforehand. The video display device generates the dot clock of a frequency that corresponds to each horizontal resolution candidate, and calculates the maximum total difference value of the digital video signal generated based on each dot clock while adjusting a phase of the dot clock. The video display device calculates maximum total difference values for all the horizontal resolution candidates, and determines the horizontal resolution, in which the maximum total difference value is largest, to be horizontal resolution of the input analog video signal.

The video display device determines, based on a difference between the pixels in the frame of the input analog video signal, the horizontal resolution of the video signal. This enables the video display device to quickly determine, when a video signal of unknown resolution is input from the outside, the resolution of the video signal to correctly display a video image.

The video display device according to the embodiment narrows down horizontal resolution candidates based on the vertical resolution calculated from the vertical synchronization signal and the horizontal synchronization signal of the input analog video signal. As a result, the video display device can shorten the processing for determining horizontal resolution.

The video display device according to the embodiment can determine the horizontal resolution of the input analog video signal by calculating the total difference value of one frame of the digital video signal. As a result, the video display device can quickly determine the horizontal resolution of the input analog video signal.

The embodiment of the present invention has been described. However, the present invention is not limited to the embodiment. Various changes understandable to those skilled in the art can be made to the configuration and the specifics of the present invention within the scope of the invention.

Explanation of Reference Numerals
10: A/D conversion unit
20: clock adjustment unit
21: clock generation unit
22: phase adjustment unit
30: control unit
31: synchronization detection unit
32: video detection unit
33: difference detection unit
34: setting storage memory
35: CPU
40: video processing unit
50: video display unit
60: frame memory

The invention claimed is:

1. A video display device comprising:
A/D conversion means for converting an input analog video signal into a digital video signal to sample said analog video signal by using a dot clock that defines sampling timing for said analog video signal;
clock generation means for generating a dot clock of a predetermined frequency based on a horizontal synchronization signal of said analog video signal;
phase adjustment means for adjusting a phase of said dot clock generated by said clock generation means; and
control means for estimating vertical resolution of said analog video signal based on a vertical synchronization signal and said horizontal synchronization signal of said analog video signal, causing said clock generation means to generate said dot clock of a frequency corresponding to each horizontal resolution for each pre-registered horizontal resolution candidate, calculating a maximum total difference value indicating a total of absolute difference values of pixel values between adjacent pixels in a horizontal direction within a predetermined range of an image based on the converted digital video signal based on said dot clock while causing said phase adjustment means to adjust a phase of said dot clock, determining, among all said horizontal resolution candidates, said horizontal resolution, in which said maximum total difference value is largest, to be horizontal resolution of said analog video signal, and displaying a video image corresponding to the determined horizontal resolution and said vertical resolution.

2. The video display device according to claim 1, wherein said control means estimates the vertical resolution of said analog video signal based on said vertical synchronization signal and said horizontal synchronization signal, and narrows down said horizontal resolution candidates of the analog video signal based on the vertical resolution.

3. The video display device according to claim 2, wherein said predetermined range comprises one frame of the image based on said digital video signal.

4. The video display device according to claim 1, wherein said predetermined range comprises one frame of the image based on said digital video signal.

5. A video display method in a video display device that includes: A/D conversion means for converting an input analog video signal into a digital video signal to sample said analog video signal by using a dot clock that defines sampling timing for said analog video signal; clock generation means for generating a dot clock of a predetermined frequency based on a horizontal synchronization signal of said analog video signal; and phase adjustment means for adjusting a phase of said dot clock generated by said clock generation means, the method comprising, by control means:

estimating vertical resolution of said analog video signal based on a vertical synchronization signal and said horizontal synchronization signal of said analog video signal;

causing said clock generation means to generate said dot clock of a frequency corresponding to each horizontal resolution for each pre-registered horizontal resolution candidate;

calculating a maximum total difference value indicating a total of absolute difference values of pixel values between adjacent pixels in a horizontal direction within a predetermined range of an image based on the converted digital video signal based on said dot clock while causing said phase adjustment means to adjust a phase of said dot clock;

determining, among all the horizontal resolution candidates, the horizontal resolution, in which the maximum total difference value is largest, to be horizontal resolution of said analog video signal; and displaying a video image corresponding to the determined horizontal resolution and said vertical resolution.

6. The video display method according to claim 5, wherein said control means estimates the vertical resolution of said analog video signal based on said vertical synchronization signal and said horizontal synchronization signal, and narrows down the horizontal resolution candidates of said analog video signal based on the vertical resolution.

7. The video display method according to claim 6, wherein said predetermined range comprises one frame of the image based on said digital video signal.

8. The video display method according to claim 5, wherein said predetermined range comprises one frame of the image based on said digital video signal.

* * * * *